Dec. 3, 1946.   S. C. HOARE   2,412,046
RESONANT CIRCUIT SATURABLE CORE MEASUREMENT APPARATUS
Filed Sept. 8, 1943
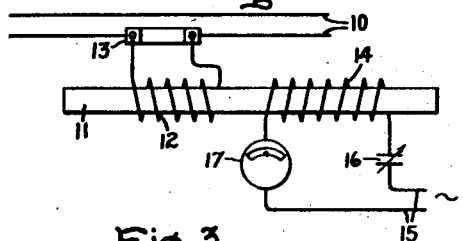
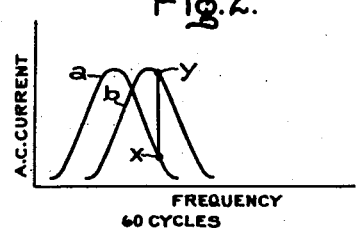
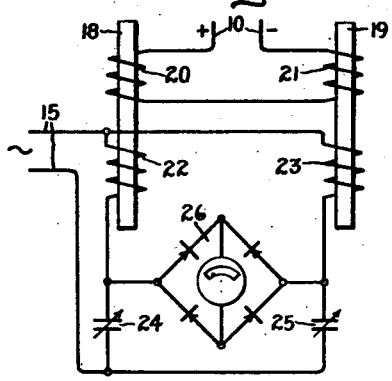
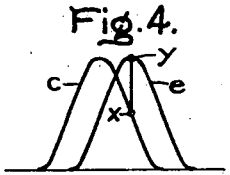
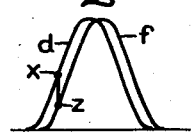
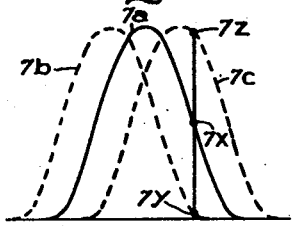
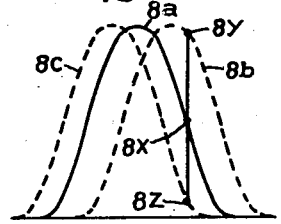
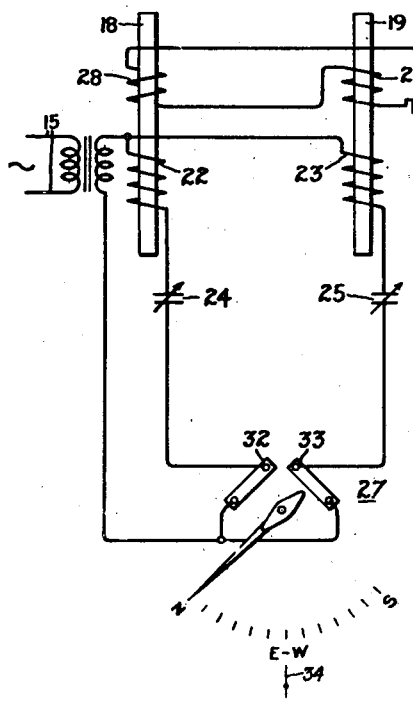
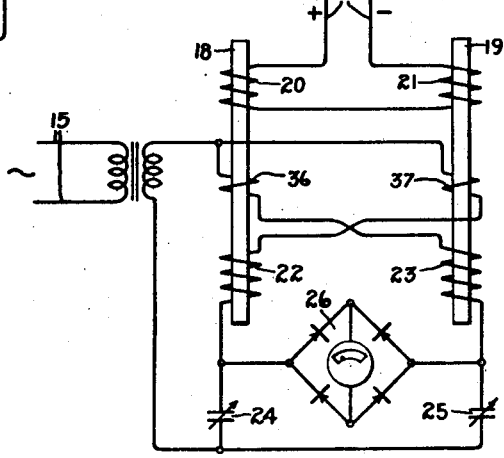
Inventor:
Stephen C. Hoare,
by Harry E. Dunham
His Attorney.

Patented Dec. 3, 1946

2,412,046

UNITED STATES PATENT OFFICE 2,412,046

RESONANT CIRCUIT SATURABLE CORE MEASUREMENT APPARATUS

Stephen C. Hoare, Manchester, Mass., assignor to General Electric Company, a corporation of New York Application September 8, 1943, Serial No. 501,549

4 Claims. (Cl. 175—183)

My invention relates to unidirectional flux saturable core measuring apparatus and circuits, and its object is to provide such apparatus of high sensitivity and amplifying ability. An important aspect of my invention is the use of a tuned circuit or circuits in which there is included, as a variable inductance, a saturable core. Where two tuned circuits are employed, a differential amplifying effect may be obtained by operation of the two circuits on different slopes or in reverse direction on the same slope of their resonant curves over the detecting or measuring range. These and other features of my invention will be explained in connection with the accompanying drawing, while the features which are considered to be novel and patentable will be pointed out in the claims appended hereto.

Fig. 1 represents a simple embodiment of my invention involving a resonant circuit in which a change in tuning is obtained by a saturable core reactor. Fig. 2 shows resonant curves explanatory of Fig. 1. Fig. 3 shows an arrangement where a pair of saturable core resonant circuits are employed differentially. Figs. 4 and 5 are resonant curves explanatory of the arrangement of Fig. 3. Fig. 6 represents a compass application of my invention where the degree of saturation is controlled by the earth's field. Figs. 7 and 8 are resonance curves explanatory of Fig. 6, and Fig. 9 represents a further embodiment of my invention where the differential resonant circuit principle is combined with a push-pull alternating current excitation amplifier scheme.

In Fig. 1 let 10 represent a direct current circuit in which it is desired to measure the current. 11 represents a saturable core of high permeability magnetic material having a low saturation point, such for example, as mu metal. This core is magnetized by unidirectional flux in proportion to the direct current to be measured by a winding 12 connected across a shunt 13 in the circuit 10. 14 represents another winding on core 11 energized by alternating current from a source 15. The winding 14 is in series with a condenser 16 and an alternating current responsive instrument 17. It is seen that the alternating current circuit contains an inductance 14 which is varied by the degree of saturation of the core 11, and the condenser 16 which may also be variable for calibration purposes. However, the saturable core inductance is the measurement variable of the A. C. circuit. The circuit will also contain some resistance, and the sharpness of the resonance curve of the circuit will depend upon the amount of resistance therein.

It is known that an arrangement similar to that here shown in Fig. 1, omitting the condenser 16, can be used to measure direct current by measuring the alternating current by a meter 17, due to the variation in the inductance of the alternating current circuit by various degrees of saturation of the core 11. However, when the alternating current circuit is tuned by means of a condenser and the circuit is properly used over the slope of the resonance curve, a large increase in sensitivity is obtained. Let it be assumed that with no direct current flowing in coil 12, the alternating current circuit has a resonant curve $a$, Fig. 2, and operates at the point $x$ of such curve for the frequency of source 15 which is assumed to be constant at 60 cycles. Hence, at such time a current $x$ will flow in instrument 17, but its indication may be suppressed as, for example, by adjustment of the zero return spring so as to have a scale reading of zero. Now with direct current flowing in coil 12, corresponding to the upper limit of the direct current to be measured, the circuit constants can be so arranged that resonant curve characteristic of the alternating current circuit will be represented by curve $b$, because due to saturation of core 11 the inductance in the alternating current circuit has been decreased, and hence, the alternating current circuit will be tuned to resonance at a higher frequency than before. However, the frequency remains constant, so that a current $y$ now flows in the instrument 17. I have found that the sensitivity of the arrangement can thus be greatly increased by simply adding the condenser and taking advantage of the resonant principle.

In Fig. 3, I have provided two saturable cores 18 and 19 each provided with saturating direct current windings 20 and 21 energized in series from a source 10, and alternating current windings 22 and 23 energized in parallel from a constant frequency source 15. Condensers 24 and 25 are provided in the parallel circuits of coils 22 and 23. A full wave direct current rectifier instrument 26 is connected to respond to the difference, if any, in voltage across the coils 22 and 23. It is noted that the direct current coils on the two cores are wound in the opposite direction, while the alternating current windings are wound in the same direction. The same effect would be obtained if the direct current coils were wound the same and the alternating windings were wound in opposite directions.

In the arrangement of Fig. 3 when there is no direct current flowing, the alternating current circuits are so adjusted that the circuit containing winding 22 and condenser 24 operates at about the midpoint of the high frequency slope of its resonance curve as at point $x$, curve $c$, Fig. 4, while the circuit containing winding 23 and condenser 25 operates at about the midpoint of the low frequency slope of its resonance curve as at point $x$, curve $d$, Fig. 5, and further, so that equal currents $x$ flow in the parallel alternating current circuits. Under these conditions it will be apparent that the voltage across which the rectifier instrument 26 is connected will be zero, and no current will flow in the rectifier instrument. Now when direct current flows in windings 20 and 21 to more or less saturate the cores 18 and 19, the reactances of the alternating current circuits will decrease and at the upper limit of direct current flow the resonance curve of the alternating current circuit containing winding 22 will be represented by curve $e$, Fig. 4, and carry an increased current $y$, while the resonance curve of the circuit containing winding 23 will be represented as at $f$, Fig. 5, and carry a decreased current $z$. Note that despite saturation of core 19, the current in its alternating current winding circuit decreases because of a further departure from a resonance condition. The voltages across windings 22 and 23 will be proportional to the difference in the currents $y-z$ flowing therethrough, and this voltage is impressed across the rectifier instrument 26 and produces a corresponding flow of direct current therethrough. It is seen then that the indication of the rectifier instrument will be proportional to the direct current flowing in circuit 10, but the amplifying ability or sensitivity of the measuring arrangement will be increased many times over nonresonant saturable core measuring schemes of the prior art.

In Fig. 6, I have shown a modification of my invention as adapted for a remote indicating magnetic direction indicator where the variable saturation effect is controlled by the earth's field. In Fig. 6 the core parts 18 and 19 are to be located so as to pick up the earth's field. For instance, they may be located on the wing of an airplane sufficiently remote from other magnetic material and disturbing influences to respond accurately to the direction and strength of the earth's field, and with their alternating current windings connected with a remote indicator 27 arranged to indicate the direction in which the airplane is headed. The core parts 18 and 19 are of such dimensions and material as to become partially saturated by the earth's field when turned in line therewith, with the turning of the airplane or other structure to which they are fixed. The earth's field takes the place of the direct current windings 20 and 21 of Fig. 3, and there are in addition, biasing direct current windings 28 and 29 wound oppositely on the two cores and connected in series to a direct current source 30 through an adjustable rheostat 31. The alternating current windings 22 and 23 and the condensers 24 and 25 in series therewith correspond to like elements in Fig. 3. The instrument 27 is shown as a ratio instrument having coils 32 and 33 connected to measure the ratio of currents in the parallel alternating current tuned circuits. This instrument can be either alternating current or rectifier direct current so long as it responds to the ratio of the alternating currents.

In the illustration it is assumed that the upper ends of the core parts 18 and 19 are toward the magnetic north, and therefore, picking up a maximum amount of the earth's field in a given direction.

The adjustment of the apparatus is as follows: When the earth's flux pickup strips 18 and 19 are turned in an east-west direction so as to pick up none of the earth's magnetic field, the current in coils 28 and 29 is adjusted so that the strips 18 and 19 are partially saturated and the condensers 24 and 25 are adjusted so that the circuit of condenser 24 operates at point $7x$, curve $7a$, Fig. 7, and the circuit of condenser 25 operates at point $8x$ on curve $8a$, Fig. 8. At this time, then, the currents in coils 32 and 33 are equal and the instrument 27 has a central deflection and indication opposite the designation E—W, indicating that the ship is headed either west or east. Inasmuch as this condition will prevail when the strips 18 and 19 are at right angles to the earth's field, the instrument 27 will not, by itself, indicate whether the ship is headed east or west, so that I provide a small, cheap compass 34 which will point toward the designations E or W depending upon the heading. The accuracy of compass 34 needs to be sufficient only to distinguish between east and west. Now let us assume the ship is headed to true magnetic north, so that the pickup strips 18 and 19 will pick up maximum earth's flux in a driven direction. The direction of current in coil 29 of strip 19 is such as to add its flux to the earth's flux in strip 19 at this time and to increase the saturation of such strip, decreasing the inductance of the corresponding alternating current circuit and causing it to have a resonance curve $8b$ and a current $8y$, Fig. 8. The current in coil 28, however, is in such direction as to oppose the earth's flux picked up by strip 18, so that the saturation of this strip is decreased and its corresponding alternating current circuit now operates at point $7y$, curve $7b$, Fig. 7. The ratio instrument 27 thus measures the ratio of currents $$\frac{8y}{7y}$$

and the instrument indication is marked with the designation N, which is the indication represented in Fig. 6.

Now when the ship is headed south, coil 28 will add its flux to the earth's flux of strip 18, while coil 29 will oppose the earth's flux of strip 19. The corresponding alternating current circuits will operate on resonant curves $7c$ and $8c$ with currents $7z$ and $8z$, respectively, Figs. 7 and 8. Under this condition coil 32 will predominate and the instrument will indicate S. For intermediate headings the instrument will have intermediate indications, and the scale may be calibrated in direction angles accordingly. If the apparatus is used in widely different localities such that the strength of the earth's field varies appreciably, recalibration for the different conditions will be called for.

The push-pull feature of Fig. 6 represents an improvement even without utilizing the resonant features. However, including the resonant principles described very materially increases the sensitivity. It is to be understood that the nature of the instrument or other device of 27, Fig. 6, may be any instrumentality which will respond to the current flow in the parallel alternating current circuits to give a signal or response in accordance with the ratio of the currents in such parallel circuits.

The sensitivity or amplification response of the resonant push-pull saturable core arrangement of Fig. 3 or 6 may be further increased by a differential inductive coupling between the parallel alternating current circuits and the saturable cores employed as represented in Fig. 9. Except for the additional alternating current windings 36 and 37 in Fig. 9, the arrangement is equivalent to that shown in Fig. 3, and equivalent parts are designated by like reference characters in the two figures. It is seen that in Fig. 9 the circuit of alternating current winding 23 on core 19 has a low turn winding 36 on core 18 wound in opposition to the main alternating current winding 22 thereon, and likewise, the circuit of alternating current winding 22 on core 18 has a low turn winding 37 on core 19 wound in opposition to main alternating current winding 23 thereon. This arrangement causes the effective alternating current exciting ampere turns to change faster than the change in alternating current exciting current. Let it be assumed that coils 22 and 23 each have 100 turns and coils 36 and 37 have 20 turns and that when the currents in the two alternating current circuits are equal, one ampere flows in each circuit. Then the effective alternating current ampere turns in each alternating current circuit are 100−20=80. Now assume that because of a different condition of saturation, the alternating current exciting current of winding 22 increases by 10 per cent and that of winding 23 decreases by 10 per cent. Then the effective ampere turns in branch 22 become 110−18=92, and the effective ampere turns in branch 23 become 90−22=68. Thus the 10 per cent change in exciting current causes a 15 per cent change in effective ampere turns in the differentially coupled alternating current circuits. The reactance in each alternating current circuit branch is proportional to the effective alternating current ampere turns. Hence, a change in saturation influencing the reactance or effective ampere turns is amplified by such differential or cross-coupling of the alternating current circuits. This is in addition to the amplification obtained by the differential resonance principle employed. By the proper use of the differential resonance principle and the differential coupling of the alternating current circuits, an amplification of the order of six times the response of the ordinary saturable core arrangement may be realized.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. Unidirectional flux responsive apparatus comprising a pair of magnetic core parts adapted to be threaded by the flux under investigation and to be subject to varying degrees of saturation by changes in the unidirectional flux threading said core parts, a pair of windings energized by direct current on said cores, a pair of parallel tuned circuits including alternating current exciting windings on said core parts, the direct current and alternating current windings on one core being similarly wound and those on the other core being reversely wound, a common source of alternating current supply for said parallel circuits, said circuits being so tuned that corresponding changes in the unidirectional flux in the pair of core parts cause the current in one circuit to increase and the current in the other circuit to decrease, and means associated with both of said tuned circuits responsive to the differential current flow in said parallel circuits.

2. Unidirectional flux responsive apparatus comprising a pair of magnetic core parts so disposed as to intercept unidirectional flux under investigation and to be subject to varying degrees of magnetic saturation by variations in the magnitude of the flux intercepted, a winding on each of said core parts, means for connecting said windings in parallel circuits to an alternating current supply, means including said windings for tuning said circuits such that corresponding changes in the magnitude of unidirectional flux intercepted by said core parts will cause the currents in the parallel circuits to vary inversely, and means responsive to the differential current flow in said circuits.

3. Unidirectional flux responsive apparatus subject to magnetic fields comprising a pair of elongated magnetic core parts mounted parallel to each other, direct current winding means on said core parts for producing reverse unidirectional flux biases in said core parts such that when in line with a unidirectional magnetic field such field, with the biasing flux, will substantially saturate one core part and substantially demagnetize the other core part, alternating current windings on said core parts, means for connecting said windings in parallel circuits to an alternating current source of supply, means including said windings for tuning said parallel circuits such that said circuits operate on similar slopes of their resonant curves and have substantially equal currents when the core parts are in neutral positions relative to the field, and means responsive to the current flow in said parallel circuits to give a signal in accordance with the ratio of the currents in said parallel circuits.

4. Unidirectional flux responsive apparatus comprising a pair of magnetic core parts adapted to intercept unidirectional flux under investigation and to be subject to various degrees of saturation by variations in the flux intercepted, a main exciting winding and an auxiliary bucking winding on each core part, a tuned circuit including the main winding on one core part and the auxiliary bucking winding on the other core part, a second tuned circuit including the remaining windings on the core parts, connections for energizing both of said circuits in parallel from a common source of alternating current supply, the tuning of said circuits being such as to cause their currents to vary inversely with respect to each other by similar changes in the fluxes intercepted by the core parts, and means associated with both of said tuned circuits responsive to the relative magnitude of current flow in said parallel circuits.

STEPHEN C. HOARE.